(12) United States Patent
Yamauchi

(10) Patent No.: US 8,243,801 B2
(45) Date of Patent: Aug. 14, 2012

(54) MOTION PREDICTION APPARATUS AND MOTION PREDICTION METHOD

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1030 days.

(21) Appl. No.: 12/113,853

(22) Filed: May 1, 2008

(65) Prior Publication Data
US 2009/0079875 A1 Mar. 26, 2009

(30) Foreign Application Priority Data
Sep. 21, 2007 (JP) .................................. 2007-246197

(51) Int. Cl.
 H03K 7/08 (2006.01)
(52) U.S. Cl. .................................. 375/240.12; 382/238
(58) Field of Classification Search ............. 375/240.01, 375/240.12, 240.16, 240.24; 382/131, 159, 382/170, 173, 199, 209, 248
See application file for complete search history.

(56) References Cited

U.S. PATENT DOCUMENTS

| | | | | |
|---|---|---|---|---|
| 5,487,172 A | * | 1/1996 | Hyatt | 712/32 |
| 5,594,504 A | * | 1/1997 | Ebrahimi | 375/240.16 |
| 5,689,312 A | * | 11/1997 | Kim | 348/699 |
| 5,808,685 A | * | 9/1998 | Jung | 375/240.16 |
| 5,969,766 A | * | 10/1999 | Kim | 375/240.14 |
| 6,473,465 B1 | * | 10/2002 | Takahashi | 375/240.28 |
| 7,336,838 B2 | * | 2/2008 | Hur et al. | 382/236 |
| 2001/0021272 A1 | * | 9/2001 | Yamori et al. | 382/236 |
| 2002/0118748 A1 | * | 8/2002 | Inomata et al. | 375/240.04 |
| 2004/0252764 A1 | * | 12/2004 | Hur et al. | 375/240.16 |
| 2005/0025244 A1 | * | 2/2005 | Lee et al. | 375/240.16 |
| 2007/0086525 A1 | * | 4/2007 | Asano | 375/240.16 |
| 2007/0091188 A1 | * | 4/2007 | Chen et al. | 348/273 |
| 2007/0160144 A1 | * | 7/2007 | Lu et al. | 375/240.16 |

FOREIGN PATENT DOCUMENTS

| | | |
|---|---|---|
| JP | 2950633 | 10/1992 |
| JP | 5-328334 | 12/1993 |
| JP | 07-154754 | 6/1995 |
| JP | 8-242456 | 9/1996 |
| JP | 200059792 | 2/2000 |

(Continued)

OTHER PUBLICATIONS

Kefei Ouyang et al. "Advanced Motion Search and Adaption Techniques for Deinterlacing", Multimedia and Expo, 2005. IEEE International Conference on Amsterdam, the Netherlands 06-06 Jul. 2005, Piscataway, NJ, USA IEEE, Jul. 6, 2005, pp. 374-377, XP010842096, ISBN: 978-0/7803-9331-8.

(Continued)

*Primary Examiner* — Chi Pham
*Assistant Examiner* — Prince A Mensah
(74) *Attorney, Agent, or Firm* — Blakely, Sokoloff, Taylor & Zafman LLP

(57) ABSTRACT

According to one embodiment, a motion prediction apparatus includes: a similarity detector that detects block similarities indicating degree of similarities between a pixel block in a current frame and pixel blocks in a next frame; a smoothness detector that detects smoothness level of the pixel block in the current frame, the smoothness level indicating smallness of an image variance of the pixel block; a weighting unit that applies weights to each of the block similarities based on the smoothness level; and a motion vector determination unit that determines a motion vector of the pixel block in the current frame based on the weighted block similarities.

8 Claims, 10 Drawing Sheets

FOREIGN PATENT DOCUMENTS

| | | |
|---|---|---|
| JP | 2005-252360 | 9/2005 |
| JP | 2006-115421 | 4/2006 |
| JP | 2007-074595 | 3/2007 |

OTHER PUBLICATIONS

Lin et al. "Ultrasound Motion Estimation Using a Hierarchial Feature Weighting Algorithm", Computerized Medical Imaging and Graphics, Pergamon Press, New York, NY, US, vol. 31, No. 3, Mar. 29, 2007, pp. 178-190, XP022003662 ISSN: 0895-6111.

European Patent Application 08008582.2 Search Report Dated Feb. 9, 2009.

Japanese Patent Application No. 2007-246197, Notification of Reasons for Refusal, mailed Jan. 4, 2012, (with English Translation).

* cited by examiner

MOTION PREDICTION APPARATUS AND MOTION PREDICTION METHOD

CROSS-REFERENCE TO RELATED APPLICATIONS

This application is based upon and claims the benefit of priority from JP-A-2007-246197, filed Sep. 21, 2007, the entire contents of which are incorporated herein by reference.

BACKGROUND

1. Field

One embodiment of the invention relates to a motion prediction apparatus and a motion prediction method which predict the motion of an object included in an image.

2. Description of the Related Art

Conventionally, motion prediction apparatuses that predict motions of objects included in images by detecting the motions of the objects as motion vectors have been known. The detection of the motion vectors is performed by using a method in which two consecutive image frames are respectively divided into a plurality of small areas (pixel blocks), searches for a small area having a highest degree of correlation from among the small areas, and represents the amount of deviation of the small area as a motion vector.

As one of the apparatuses for detecting the motion vectors, for example, a motion vector detection apparatus as described below is disclosed in JP-A-2950633. The motion vector detecting apparatus generates a predicted vector that predicts the motion of a target pixel block by using motion vectors of pixel blocks adjacent to the target pixel block and changes the area of a search range for the motion vector based on reliability of the predicted vector.

However, among images of which motion vectors are to be detected, there may be an image such as an image of a blue sky without any cloud of which parts have little differences from one another. According to an embodiment of the present invention, a degree of smoothness means a degree of smallness of a variance in an image. Thus, an image having a high degree of smoothness represents an image having a small variance, and an image having a low degree of smoothness represents an image having a large variance.

Here, as an example, as shown in FIG. 10, a pixel block F1 included in an image frame F whose motion vector is to be detected is assumed to be a small area (for example, a blue sky part) having a high degree of smoothness. In this case, even when the pixel block F1 is a stop area in which there is no motion, if adjacent pixel blocks F2 and F3 also have a high degree of smoothness (for example, a part of the blue sky), there is little difference between the pixel block F1 and any one of the pixel blocks F2 and F3. Accordingly, the detected motion vector P1 or P2 has a large non-uniformity due to a noise or the like.

A case where the motion vector of the pixel block F5 adjacent to the pixel block F4 having large non-uniformity of the motion vector is to be detected will be considered. As an example, it is assumed that a blue sky part that is the same as in the pixel blocks F1 to F3 is displayed in the pixel block F4 and a part of a plane in the blue sky is displayed in the pixel block F5.

In this case, it is assumed that the motion vector of the pixel block F4 has been already detected and an operation for calculating the motion vector of the pixel block F5 is to be performed by using the motion vector of the pixel block F4. Then, since the non-uniformity of the motion vectors of the pixel block F4 is large, the precision of calculation is deteriorated, and thereby the precision of detection of the motion vector becomes low.

In consideration of the above case, a method in which a weighting process is performed such that uniformly small motion vectors are easily selectable may be used. When this weighting process is performed, the non-uniformity of motion vectors detected in the pixel block F4 becomes low.

However, when the weighting process is performed, only small motion vectors are configured to be easily selected. Accordingly, there is a disadvantage that large motion vectors are not selected even in a case where the large motion vectors are to be selected originally.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
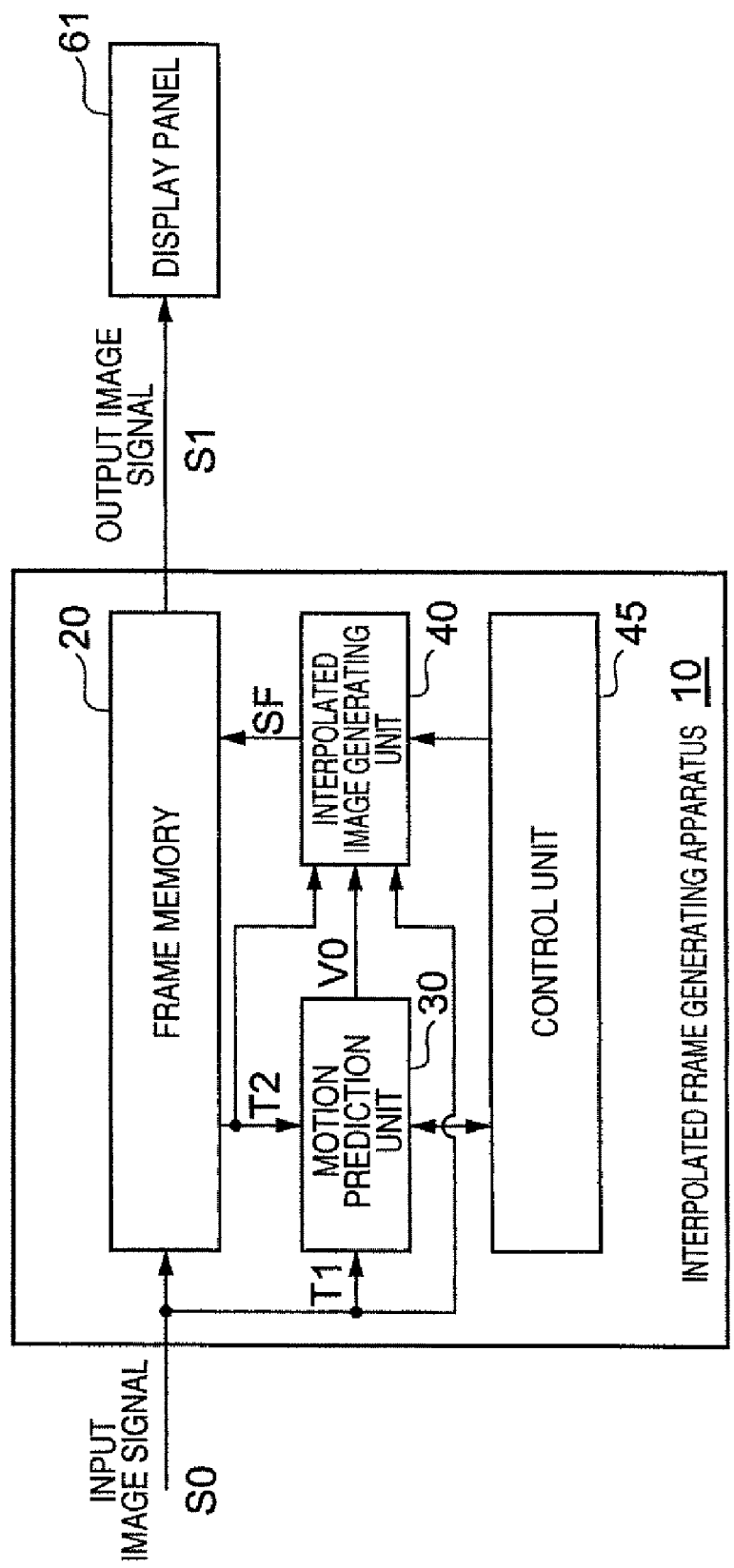
FIG. 1 is an exemplary block diagram showing the configuration of an interpolated frame generating apparatus according to an embodiment of the present invention.

Various embodiments according to the invention will be described hereinafter with reference to the accompanying drawings. In general, according to one embodiment of the invention, a motion prediction apparatus includes: a similarity detector that detects block similarities indicating degree of similarities between a pixel block in a current frame and pixel blocks in a next frame; a smoothness detector that detects smoothness level of the pixel block in the current frame, the smoothness level indicating smallness of an image variance of the pixel block; a weighting unit that applies weights to each of the block similarities based on the smoothness level; and a motion vector determination unit that determines a motion vector of the pixel block in the current frame based on the weighted block similarities.

According to another embodiment of the invention, a motion prediction method includes: detecting similarities indicating degree of similarities between a pixel block in a current frame and pixel blocks in a next frame; detecting smoothness level of the pixel block in the current frame, the smoothness level indicating smallness of an image variance of the pixel block; applying weights to each of the block similarities based on the smoothness level; and determining a motion vector of the pixel block in the current frame based on the weighted block similarities.

Hereinafter, embodiments of the present invention will be described. Like reference numerals in the drawings denote like elements, and thus their description will be omitted.

(Configuration of Interpolation Frame Generating Apparatus)

A motion prediction apparatus according to the embodiments of the present invention is installed to an interpolated frame generating apparatus 10 shown in FIG. 1, and thus the interpolated frame generating apparatus 10 will be described first.

FIG. 1 is a block diagram showing the configuration of an interpolated frame generating apparatus 10 according to an embodiment of the present invention. This interpolated frame generating apparatus 10 is included in an apparatus such as a television set, a personal computer, or a cellular phone which has an image display function.

This interpolated frame generating apparatus 10 is configured to generate interpolated frames for interpolating a plurality of image frames from the plurality of image frames constituting an input image signal S0 (60 F/s) that is input and output an output image signal S1 (120 F/s), into which the generated interpolated frames are inserted, on a display panel 61.

The interpolated frame generating apparatus 10 includes a frame memory 20, a motion prediction unit 30, an interpolated image generator 40, and a control unit 45, and is connected to a display panel 61 that is constituted by a liquid crystal display panel or the like and serves as image display means.

The frame memory 20 stores the input image signal S0 for each image frame. The motion prediction unit 30 detects a motion vector V0 by performing a block match process between an image frame input not through the frame memory 20 and the image frame stored in the frame memory 20 and outputs the detected motion vector V0 to the interpolated image generator 40. The configuration and operation of the motion prediction unit 30 will be descried later in detail.

The interpolated image generator 40 generates an interpolated frame SF generated based on the image frame input directly not through the frame memory 20, the image frame stored in the frame memory 20, and the detected motion vector V0 and stores the generated interpolated frame SF in the frame memory 20. In addition, the operation of this interpolated image generator 40 will be described later in detail. The control unit 45 controls generation of the interpolated frame by outputting a block timing signal to the motion prediction unit 30 or the like.

Figure 2:
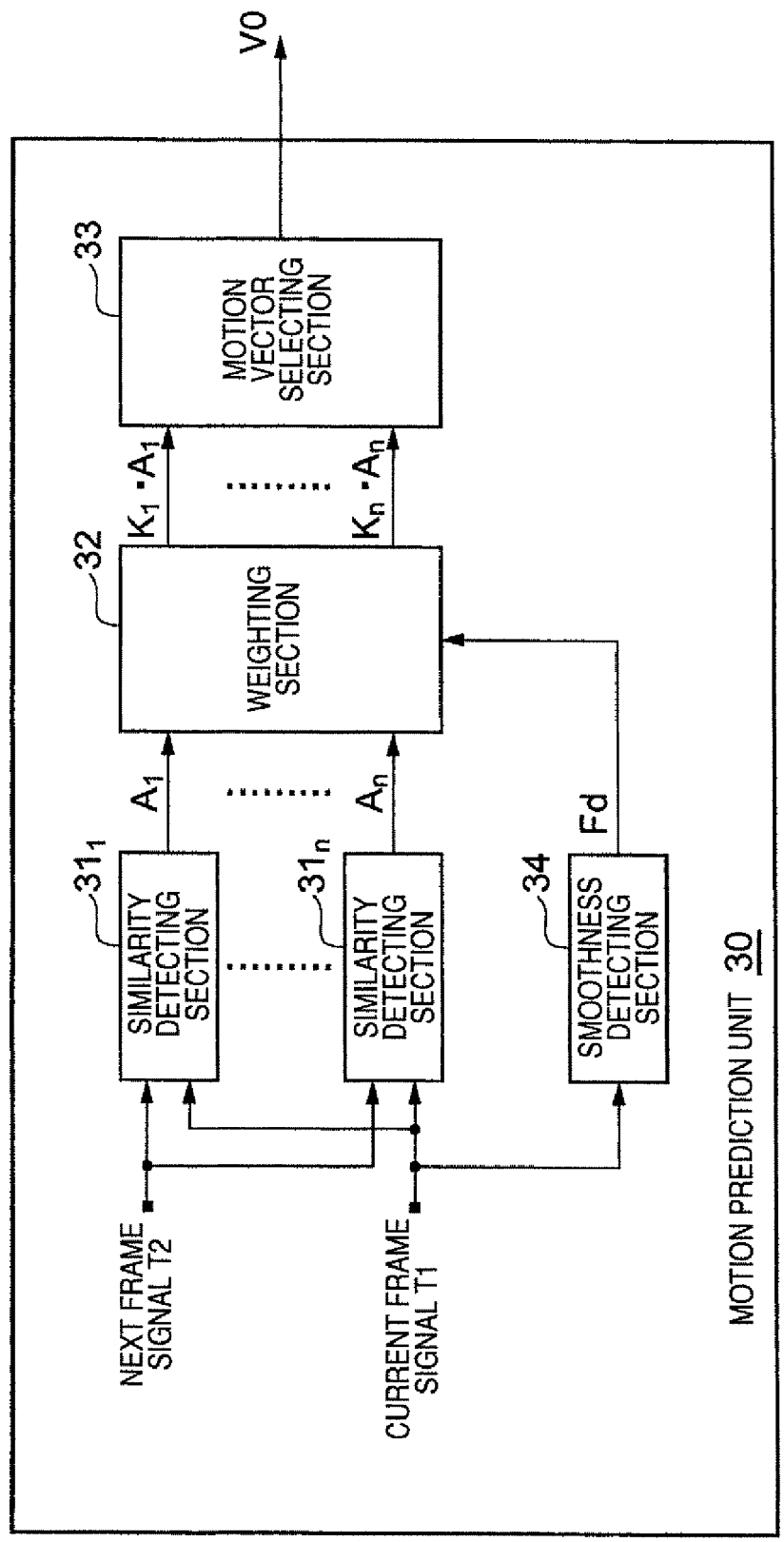
FIG. 2 is an exemplary block diagram showing the configuration of a motion prediction unit as an example.

Next, the configuration of the motion prediction unit 30 will be described with reference to FIG. 2. FIG. 2 is a block diagram showing the configuration of the motion prediction unit 30.

The motion prediction unit 30, as shown in FIG. 2, has similarity detectors 31 ((311 to 31n), a weighting unit 32, a motion vector determination unit 33, and a smoothness detector 34.

The similarity detectors 31 receive a current frame signal T1 input directly not through the frame memory 20 and a next frame signal T2 input from the frame memory 20 and detect the degree of similarity between pixel blocks by performing a block match process for two image frames included in the frame signals.

The similarity detectors 31 are disposed for n directions in which the motion vectors are to be detected (similarity detectors 311, 312, . . . , 31n).

The similarity detectors 311 to 31n output similarity data A1 to An representing the detected degrees of similarity to the weighting unit 32. The similarity sections 31 can calculate the similarity data A1 to An by using SADs (Sum of Absolute Difference: sum of absolute values of pixel differences) of corresponding pixel blocks.

The weighting unit 32 performs a weighting process by using weighting factors K1 to Kn for the similarity data A1 to An output from the similarity detectors 31. The weighting unit 32 adjusts values of the weighting factors K1 to Kn based on the smoothness data Fd, to be described later, output from the smoothness detector 34 and performs the weighting process for the similarity data A1 to An by multiplying the similarity data A1 to An by the adjusted weighting factors K1 to Kn.

The motion vector determination unit 33 selects a vector value representing a displacement between pixel blocks having a highest correlation level based on the similarity data K1×A1 to Kn×An weighted by the weighting unit 32 and outputs a motion vector V0 based on the selected vector value.

The motion vector determination unit 33 determines pixel blocks for which the value of the similarity data K1×A1 to Kn×An is a minimum to be the pixel blocks having the highest correlation level.

Figure 3:
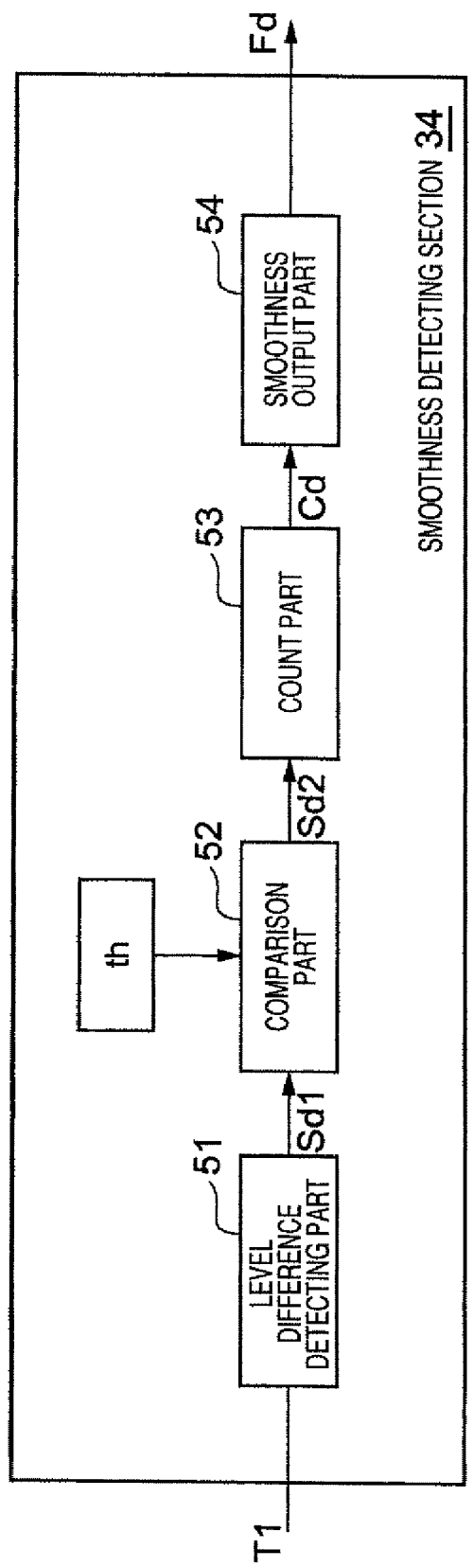
FIG. 3 is an exemplary block diagram showing the configuration of a smoothness detector as an example.

The smoothness detector 34 has a configuration as shown in FIG. 3. The smoothness detector 34 has a level difference detector 51, a comparing unit 52, a counter 53, and a smoothness output unit 54.

The level difference detector 51 detects signal level differences Sd1 between adjacent pixels of a pixel block in which the motion vector V0 is detected. The comparing unit 52 compares the signal level differences Sd1 with a predetermined threshold value th and outputs the signal level differences Sd2 representing values equal to or larger than the threshold value th to the counter 53.

The counter 53 counts the number of pixels (target pixels) that represent signal level differences from adjacent pixels equal to or larger than the threshold value th based on the signal level differences Sd2 and outputs count data Cd representing the result of the counting operation.

The smoothness output unit 54 detects the degree of smoothness based on the count data Cd output from the counter 53 and outputs smoothness data Fd.

(Operation of Interpolated Frame Generating Apparatus)

Figure 4:
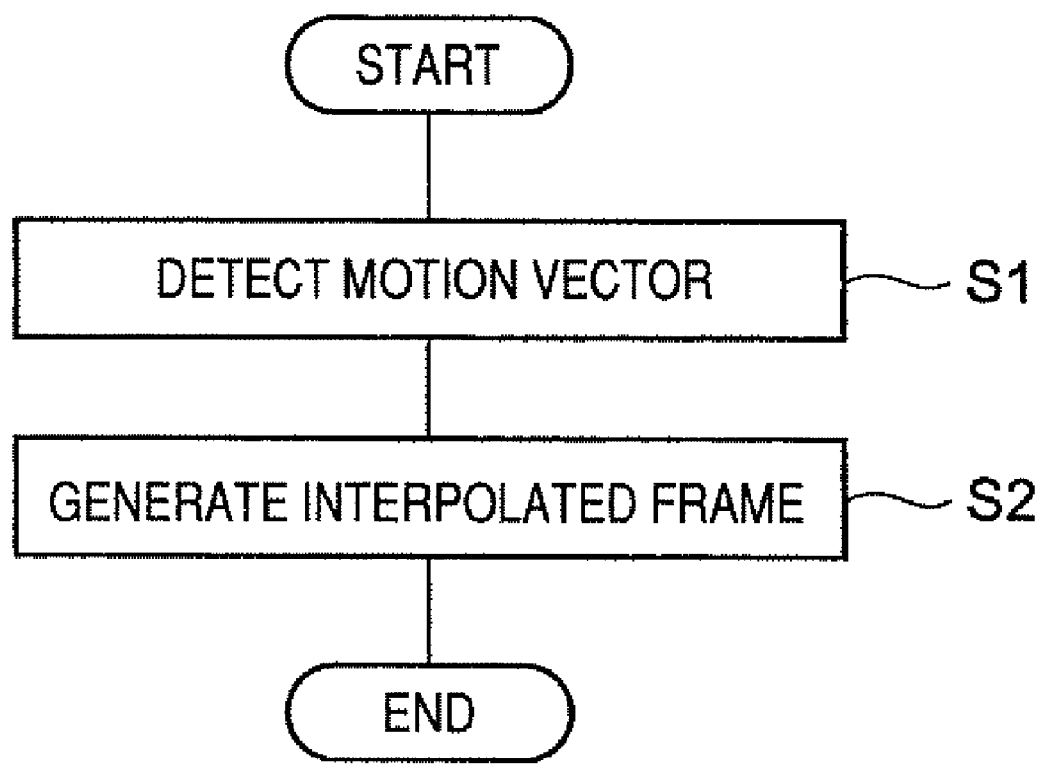
FIG. 4 is an exemplary flowchart showing the operation sequence of an interpolated frame generating process performed in an interpolated frame generating apparatus.

Next, the operation of the interpolated frame generating apparatus 10 will be described. The interpolated frame generating apparatus 10 generates an interpolated frame by performing an interpolated frame generating process according to a flowchart shown in FIG. 4.

When starting the interpolated frame generating process, the interpolated frame generating apparatus 10 performs a motion vector detecting process (S1), and subsequently generates an interpolated frame in S2. When the interpolated frame is generated, the control unit 45 performs an operation as image signal outputting means and outputs an output image signal S1 on the display panel 61.

Figure 5:
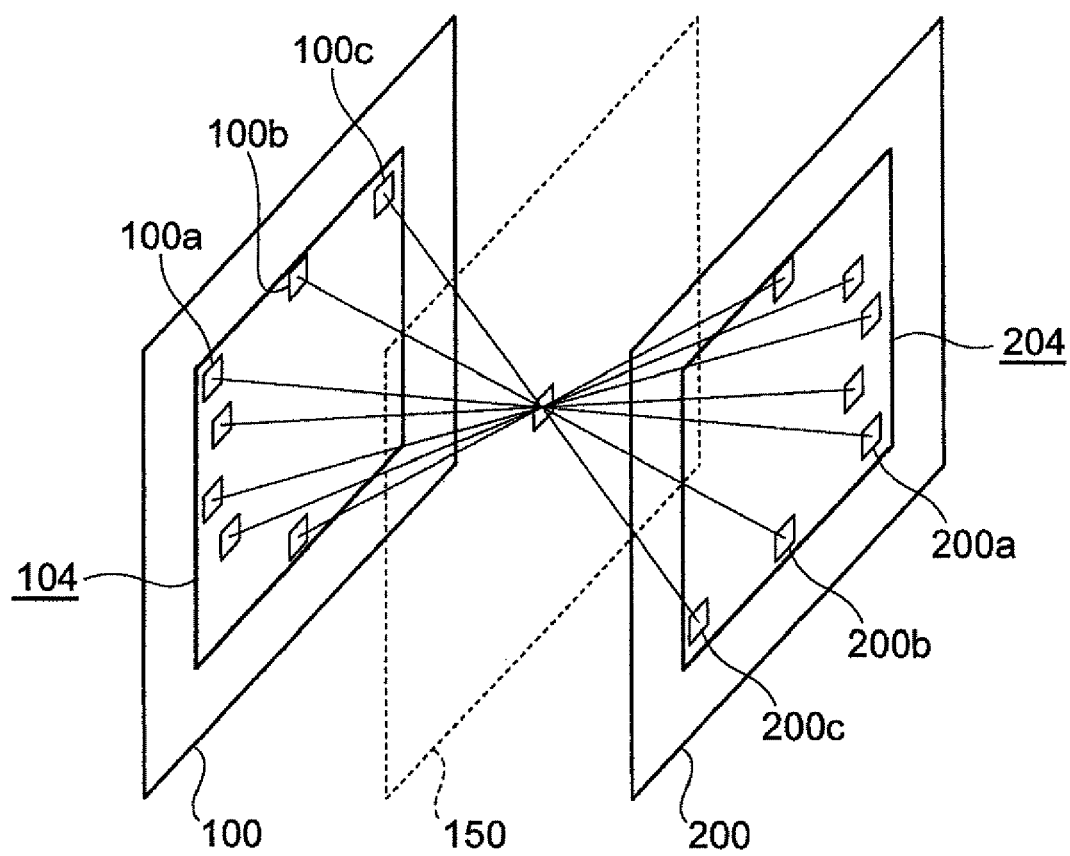
FIG. 5 is an exemplary perspective view of two image frames and an interpolated frame to which a motion vector detecting sequence according to an embodiment of the present invention is applied.

In the motion vector detecting process, the motion prediction unit 30 detects a motion vector V0 by performing a block match process between two image frames as shown in FIG. 5.

When the motion vector V0 is detected, the interpolated image generator 40 generates the interpolated frame 150 based on the motion vector V0 output from the motion prediction unit 30, as described below.

This interpolated frame 150 is a frame interpolated between the previous frame (referenced frame) 100 that is directly input not through the frame memory 20 and the next frame (frame for detecting a reference frame) 200 stored in the frame memory 20.

The interpolated image generator 40 calculates a time interval between pixel blocks of the previous frame 100 as shown in FIG. 5 and pixel blocks of the next frame 200 and contracts the motion vector V0 at the ratio of the time interval from the next frame 200 to the interpolated frame 150 to the calculated time interval.

Then, the interpolated image generator 40 generates pixel blocks constituting the interpolated frame 150 by displacing corresponding pixel blocks of the next frame 200 based on the contracted motion vector V0. The interpolated image generator 40 generates the interpolated frame 150 by repeating this process for each pixel block of the previous frame 100 and each pixel block of the next frame 200.

In the motion prediction unit 30, in order to detect the motion vector V0, the similarity detection sections 31 perform a block matching process for the image frame (previous frame) 100 included in the current frame signal T1 and the image frame (next frame) 200 included in the next frame signal T2.

In this block matching process, the previous frame 100 that is located in the former time point and the next frame 200 that is located in the latter time point are respectively divided into a plurality of pixel blocks at timings representing block timing signals.

In this embodiment, as shown in FIG. 5, the previous frame 100 is divided into a plurality of pixel blocks including pixel blocks 100a, 100b, and 100c, and the next frame 200 is divided into a plurality of pixel blocks including pixel blocks 200a, 200b, and 200c.

Then, the degrees of similarity between the pixel blocks of the previous frame 100 and the next frame 200 within the search ranges 104 and 204 are detected by the similarity detectors 31. The similarity detectors 31 output the detection result of the degrees of similarity as similarity data A1 to An.

The smoothness detector 34 inputs the current frame signal T1 and detects degrees of smoothness for pixel blocks in which the motion vector V0 is detected.

In this case, the level difference detector 51 of the smoothness detector 34 detects signal level differences Sd1 between adjacent pixels of the pixel blocks in which the motion vector V0 is detected.

Then, the signal level differences Sd1 and the threshold value th are compared with each other by the comparing unit 52 and signal level differences Sd2 representing values equal to or larger than the threshold value th are output to the counter 53.

Then, the counter 53 counts the number of target pixels based on the signal level differences Sd2 output from the comparing unit 52, and count data Cd representing the counting result is output to the smoothness output unit 54.

In addition, the smoothness output unit 54 detects the degree of smoothness based on the count data Cd output from the counter 53, as described below, and outputs smoothness data Fd.

In this case, the smoothness output unit 54 detects the degree of smoothness such that the degree of smoothness decreases as the value of the count data Cd increases and the degree of smoothness increases as the value of the count data Cd decreases.

Figure 6:
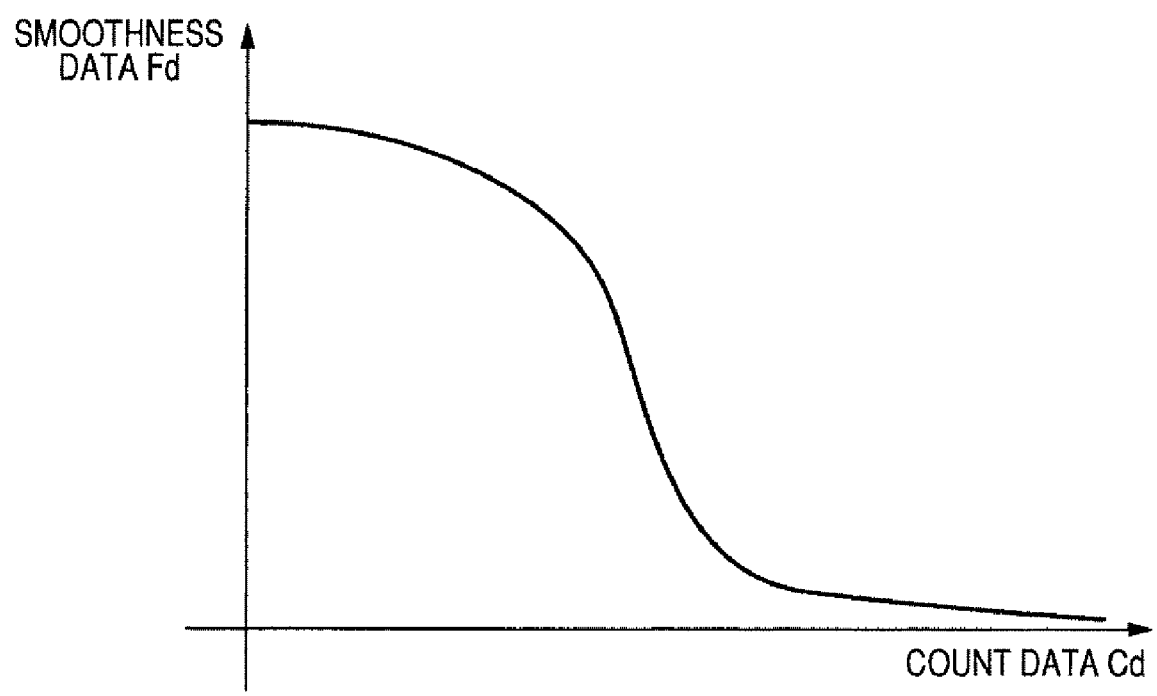
FIG. 6 is an exemplary diagram showing an example of a smoothness curve.

For example, the smoothness output unit 54 can acquire the degree of smoothness based on a smoothness curve shown in FIG. 6 and output smoothness data Fd representing the acquired degree of smoothness. The smoothness output unit 54 serves as a smoothness data outputting means.

This smooth curve represents correspondence relationship between the smoothness data Fd and the count data Cd. It is configured that the degree of smoothness decreases as the value of the count data Cd increases and the degree of smoothness increases as the value of the count data Cd decreases.

The weighting unit 32 performs a weighting process for the similarity data A1 to An based on the smoothness data Fd output from the smoothness detector 34.

Here, the weighting factors K1 to Kn for the similarity data A1 to An are represented by K1=K×KB1, K2=K×KB2, . . . , Kn=K×KBn, and values of the weighting factors KB1 to KBn that become bases are set to be larger for a motion vector as the motion vector increases in size. Accordingly, as the coefficient K increases, relatively large motion vectors are heavily weighted, and thus, relatively small motion vectors can be easily selected.

In this case, the weighting unit 32 adjusts the weighting factors K1 to Kn based on the smoothness data Fd. In other words, the weighting unit 32 adjusts the weighting factors K1 to Kn such that the weighting factors K1 to Kn are set to be larger as the smoothness data Fd increases, and the weighting factors K1 to Kn are set to be smaller as the smoothness data Fd decreases. The weighting process is performed by multiplying the similarity data A1 to An by the adjusted weighting factors K1 to Kn.

Figure 7:
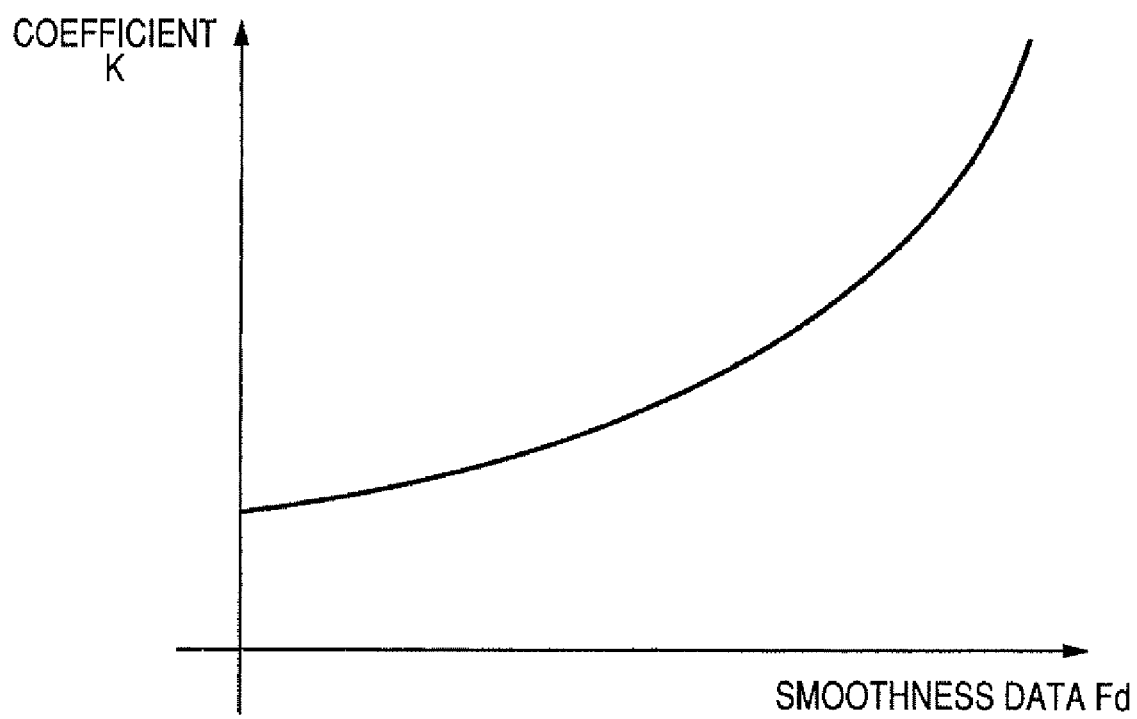
FIG. 7 is an exemplary diagram showing an example of an adjustment curve.

For example, the weighting unit 32 can adjust the weighting factors K1 to Kn based on an adjustment curve shown in FIG. 7.

This adjustment curve represents correspondence relationship between the coefficient K and the smoothness data Fd. In the adjustment curve, the relationship between the coefficient K and the smoothness data Fd is set such that the weighting factors K1 to Kn become larger as the smoothness data Fd increases and the weighting factors K1 to Kn become smaller as the smoothness data Fd decreases.

Accordingly, the weighting process is performed by adjusting such that the similarity data A1 to An for a larger motion vector increases as the degree of smoothness of the pixel block becomes higher and a difference between values of a large motion vector and a small motion vector decreases as the degree of smoothness become lower.

Then, the motion vector determination unit 33 selects a motion vector based on the weighted similarity data K1×A1 to Kn×An.

As described above, in the motion prediction unit 30, a more heavily weighting process is performed for the similarity data A1 to An for a larger motion vector as the degree of smoothness of the pixel block becomes high, that is, as the variance of an image becomes smaller, like in a case of an image of a blue sky without any cloud.

Accordingly, a smaller motion vector, that is, a vector having a smaller motion can be easily selected by the motion vector determination unit 33 as the degree of smoothness of the pixel block becomes high.

In addition, the weighting process is performed such that a weighting difference between a large motion vector and a small motion vector decreases as the degree of smoothness becomes lower, that is, as the variance of an image in the pixel block increases. Accordingly, a larger vector, that is, a vector having a larger motion is configured to be more easily selected by the motion vector determination unit 33 than a pixel block having a high degree of smoothness.

As described above, in the motion prediction unit 30, a motion vector having a smaller motion is configured to be more easily selected in a pixel block having a high degree of smoothness, and thereby non-uniformity of selected motion vectors can be suppressed. On the other hand, as in a pixel block having a low degree of smoothness, in a case where a larger motion vector is to be selected originally, the weighting factors are set to be smaller, and thereby a motion vector having a larger motion can be more easily selected.

Accordingly, in a case where a motion vector is detected in a pixel block adjacent to a pixel block having a high degree of smoothness, the motion vector can be detected with high precision even by using a motion vector detected in a pixel block having a high degree of smoothness. Thereby, the motion prediction unit 30 can perform a motion prediction process with high precision.

Figure 8:
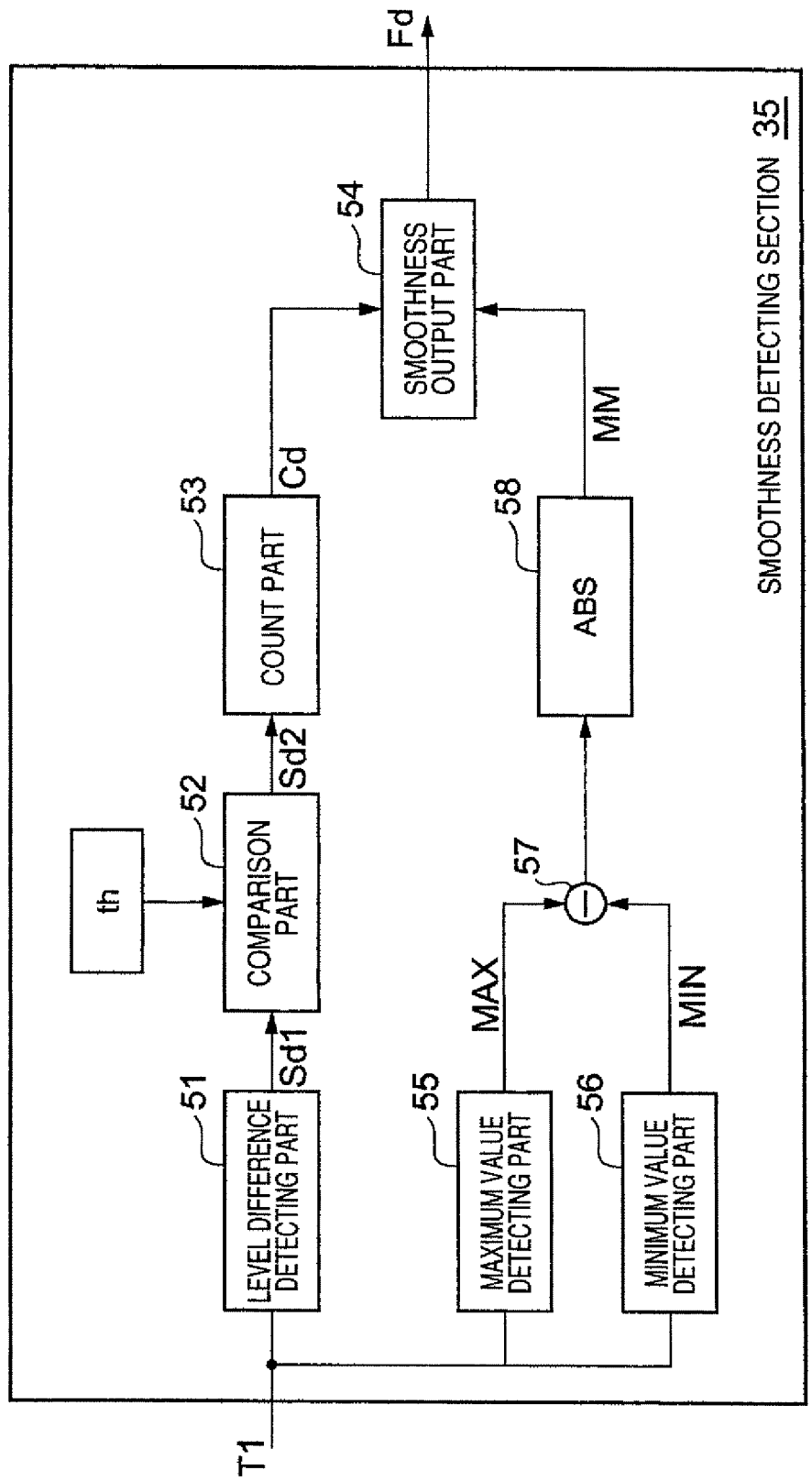
FIG. 8 is an exemplary block diagram showing an example of the configuration of another smoothness detector.

A smoothness detector 35 shown in FIG. 8, instead of the smoothness detector 34, may be used in the motion prediction unit 30.

The smoothness detector 35 shown in FIG. 8 has a maximum value detector 55, a minimum value detector 56, a subtractor 57, and an ABS 58, which is different from the smoothness detector 34 shown in FIG. 3.

The maximum value detector 55 detects a maximum signal level within a pixel block and outputs a maximum level signal MAX representing the maximum signal level to the subtractor 57. The minimum value detector 56 detects a minimum signal level within a pixel block and outputs a minimum level signal MIN representing the minimum signal level to the subtractor 57.

The subtractor 57 detects a maximum level difference representing the level difference of the maximum level signal MAX and the minimum level signal MIN and outputs the maximum level difference to the ABS 58. The ABS 58 outputs the absolute differential value MM that is the absolute value of the maximum level difference detected by the subtractor 57. The subtractor 57 and the ABS 58 serve as maximum level difference detecting means.

The smoothness output unit 54 detects the degree of smoothness based on the count data Cd and the absolute differential value MM output from the ABS 58 and outputs the smoothness data Fd.

Figure 9:
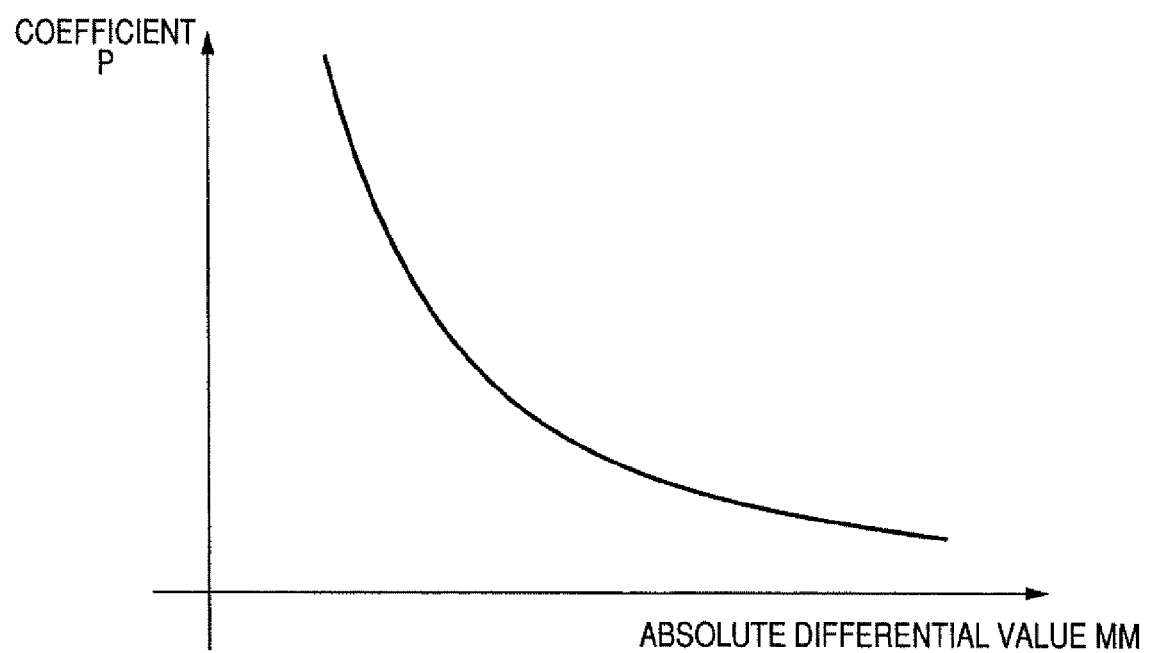
FIG. 9 is an exemplary diagram showing an example of a coefficient curve.
Figure 10:
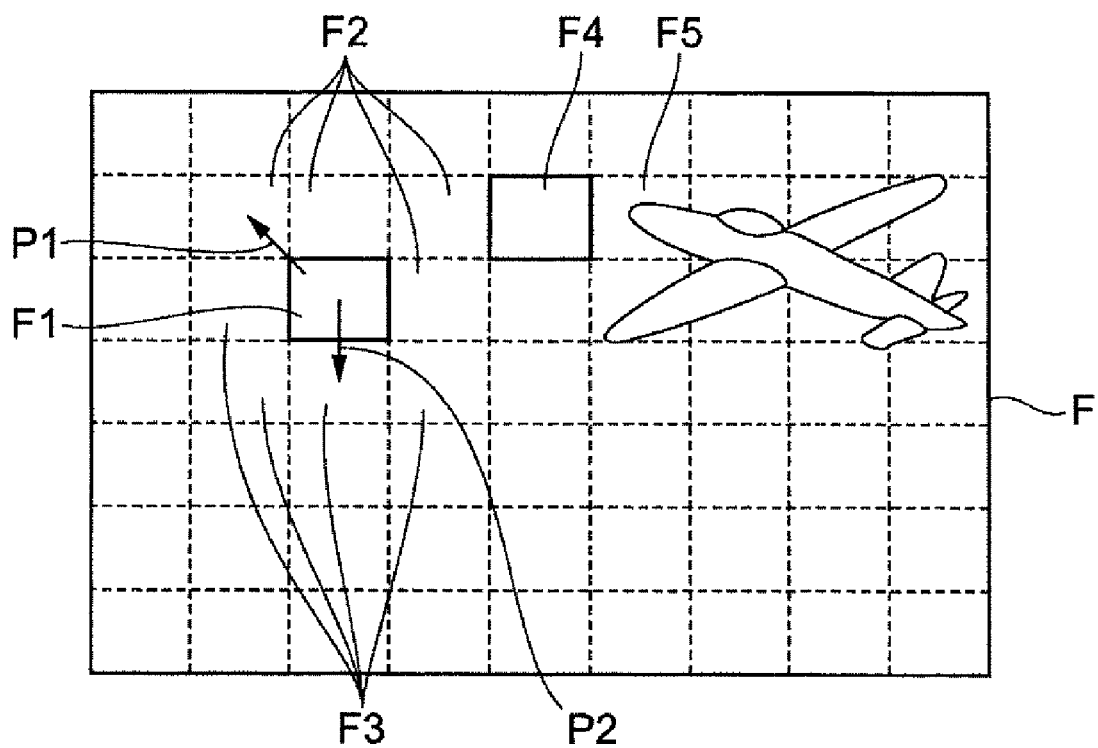
FIG. 10 is an exemplary schematic diagram showing an example of an image frame of which motion vectors are to be detected.

For example, the smoothness output unit 54 outputs smoothness data Fd resulting from multiplying the smoothness data Fd acquired based on the count data Cd by a coefficient P acquired from the coefficient curve as shown in FIG. 9.

This coefficient curve represents relationship between the absolute differential value MM and the coefficient P. The coefficient curve is set such that the degree of smoothness increases as the absolute differential value MM decreases and the degree of smoothness decreases as the absolute differential value MM increases.

Accordingly, the smoothness output unit 54 outputs smooth data Fd having a larger value as the absolute differential value MM decreases, and outputs smooth data Fd having a smaller value as the absolute differential value MM increases.

In the above-described smoothness detector 34, a pixel block having a small difference between adjacent pixels, that is, a pixel block in which pixels gradually change is easily determined to have a high degree of smoothness. However, when there is a large difference between the maximum signal level and the minimum signal level, it is preferable that such a pixel block is treated as a pixel block having a low degree of smoothness in consideration of a large variance in the whole block.

The smoothness detector 35 is configured to be able to treat such a pixel block as a pixel block having a low degree of smoothness and can increase the precision of detection of the motion vector, compared to the smoothness detector 34.

Although embodiments of the present invention have been described as above, however, the embodiments are not for the purpose of limiting the apparatus and method of the invention, and various modified examples can be easily made. In addition, an apparatus or a method constituted by appropriately combining constituent elements, functions, aspects, or operations in a method of the above-described embodiments belongs to the scope of the present invention.

As described with reference to the embodiment, there is provided a motion prediction apparatus and a motion prediction method capable of increasing precision of detection of motion vectors in a small area adjacent to a small area having a high degree of smoothness and performing a motion prediction process with high precision by suppressing non-uniformity of the motion vectors in a small area having a high degree of smoothness are acquired.

What is claimed is:

1. A motion prediction apparatus comprising:
   a similarity detector that detects block similarities indicating degree of similarities between a pixel block in a current frame and pixel blocks in a next frame;
   a smoothness detector that detects smoothness level of the pixel block in the current frame, the smoothness level indicating smallness of an image variance of the pixel block;
   a weighting unit that applies weights to each of the block similarities based on the smoothness level; and
   a motion vector determination unit that determines a motion vector of the pixel block in the current frame based on the weighted block similarities, wherein
   the weighting unit applies weights to the block similarities such that the motion vector determination unit tends to determine the motion vector having a small absolute value for the pixel block when the smoothness level of the pixel block is large.

2. The motion prediction apparatus according to claim 1, wherein the smoothness detector includes:
   a counter that counts the number of pixels having predetermined or more difference of signal level from adjacent pixels from among the pixels included in the pixel block; and
   a smoothness output unit that outputs the smoothness level based on the number of the pixels counted by the counter, the smoothness level being set to be large when the number of the pixels counted by the counter is small, and the smoothness level being set to be small when the number of the pixels counted by the counter is large.

3. The motion prediction apparatus according to claim 2, wherein the smoothness detector further includes:
   a level difference detector that detects a signal level differences between adjacent pixels within the pixel block; and
   a comparing unit that compares the signal level differences detected by the level difference detector with the predetermined difference of signal level, and
   wherein the counter counts the number of pixels having predetermined difference of signal level based on the comparison result by the comparing unit.

4. The motion prediction apparatus according to claim 2, wherein the smoothness detector further includes a maximum level difference detector that detects a level difference between a maximum signal level and a minimum signal level of the pixels included in the pixel block, wherein the smoothness output unit outputs the smoothness level so that the smoothness level is set to be large when the maximum level difference detected by the maximum level difference detector is small, and wherein the smoothness output unit determines the smoothness level so that the smoothness level is set to be small when the maximum level difference is large.

5. The motion prediction apparatus according to claim 1, wherein the weighting unit applies the weights by using a coefficient that is set to be large when the smoothness level is large.

6. The motion prediction apparatus according to claim 1, wherein the motion vector determination unit outputs the motion vector to an interpolated image generator that generates an interpolated image to be inserted between the current flame and the next flame based on the motion vector.

7. The motion prediction apparatus according to claim 1, wherein the interpolated image generator outputs the generated interpolated image to a display for displaying video image that includes the interpolated image.

8. A motion prediction method comprising:
  detecting similarities indicating degree of similarities between a pixel block in a current frame and pixel blocks in a next frame;
  detecting smoothness level of the pixel block in the current frame, the smoothness level indicating smallness of an image variance of the pixel block;
  applying weights to each of the block similarities based on the smoothness level; and
  determining a motion vector of the pixel block in the current frame based on the weighted block similarities, the motion vector having a small absolute value for the pixel block when the smoothness level of the pixel block is large.

* * * * *